United States Patent
Szegedi

(10) Patent No.: US 12,491,932 B2
(45) Date of Patent: Dec. 9, 2025

(54) STEERING COLUMN FOR A STEER-BY-WIRE STEERING SYSTEM

(71) Applicant: Robert Bosch GmbH, Stuttgart (DE)

(72) Inventor: Sandor Szegedi, Nadudvar (HU)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 18/701,139

(22) PCT Filed: Sep. 22, 2022

(86) PCT No.: PCT/EP2022/076385
§ 371 (c)(1),
(2) Date: Apr. 12, 2024

(87) PCT Pub. No.: WO2023/061721
PCT Pub. Date: Apr. 20, 2023

(65) Prior Publication Data
US 2024/0351631 A1    Oct. 24, 2024

(30) Foreign Application Priority Data

Oct. 14, 2021   (DE) .................. 10 2021 211 576.4

(51) Int. Cl.
*B62D 5/00* (2006.01)
*B62D 6/00* (2006.01)

(52) U.S. Cl.
CPC ............ *B62D 5/006* (2013.01); *B62D 5/001* (2013.01); *B62D 5/005* (2013.01); *B62D 6/008* (2013.01)

(58) Field of Classification Search
None
See application file for complete search history.

(56) References Cited

U.S. PATENT DOCUMENTS

| | | | | |
|---|---|---|---|---|
| 8,002,075 | B2 * | 8/2011 | Markfort | B62D 1/10 |
| | | | | 280/192 |
| 9,022,167 | B2 * | 5/2015 | Park | B62D 5/065 |
| | | | | 180/405 |
| 9,393,992 | B2 * | 7/2016 | Ognibene | B62D 5/32 |
| 10,953,912 | B2 * | 3/2021 | Rawlings | F16H 57/039 |
| 11,027,768 | B2 * | 6/2021 | Cimatti | B62D 5/001 |
| 11,447,173 | B2 * | 9/2022 | Wilkes | B62D 5/006 |

(Continued)

FOREIGN PATENT DOCUMENTS

| | | | | |
|---|---|---|---|---|
| CN | 103448789 | A * | 12/2013 | .......... B62D 5/0409 |
| CN | 105313954 | A * | 2/2016 | .............. B62D 5/04 |

(Continued)

OTHER PUBLICATIONS

International Search Report corresponding to PCT Application No. PCT/EP2022/076385, mailed Jan. 27, 2023. (German and English language document). (5 pages).

*Primary Examiner* — Kevin R Steckbauer
(74) *Attorney, Agent, or Firm* — Maginot, Moore & Beck LLP

(57) ABSTRACT

A steering column for a steer-by-wire steering system for a motor vehicle having a steering wheel is disclosed. The steering column includes (i) a fixed steering wheel hub, and (ii) a force-feedback unit which can transmit torque to the steering wheel. The force-feedback unit includes a first electrical motor and a second electrical motor. The first electric motor acts directly on the steering wheel. The second electric motor acts on the steering wheel via a transmission.

6 Claims, 2 Drawing Sheets

(56) References Cited

U.S. PATENT DOCUMENTS

| | | | | |
|---|---|---|---|---|
| 11,498,615 | B2* | 11/2022 | Wilson-Jones | B62D 5/0412 |
| 11,926,371 | B2* | 3/2024 | Rawlings | B62D 5/006 |
| 11,945,496 | B2* | 4/2024 | Wilkes | B62D 5/006 |
| 12,054,191 | B2* | 8/2024 | Tochev | B62D 1/16 |
| 12,384,453 | B2* | 8/2025 | Wilson-Jones | B62D 6/008 |
| 2007/0131476 | A1* | 6/2007 | Kubokawa | B62D 5/006 |
| | | | | 180/444 |
| 2015/0203150 | A1* | 7/2015 | Ognibene | B62D 5/003 |
| | | | | 180/403 |
| 2019/0092374 | A1* | 3/2019 | Nofzinger | B62D 5/006 |
| 2019/0135332 | A1* | 5/2019 | Cimatti | B62D 5/0454 |
| 2019/0202492 | A1* | 7/2019 | Niwa | B62D 5/0421 |
| 2019/0283796 | A1* | 9/2019 | Rawlings | F16H 1/16 |
| 2019/0367076 | A1* | 12/2019 | Kim | B62D 5/0409 |
| 2020/0172150 | A1* | 6/2020 | Wilkes | B62D 5/0442 |
| 2021/0107557 | A1* | 4/2021 | Wilkes | B62D 5/006 |
| 2021/0107560 | A1* | 4/2021 | Wilson-Jones | B62D 5/006 |
| 2022/0379946 | A1* | 12/2022 | Tochev | B62D 5/04 |
| 2022/0379951 | A1* | 12/2022 | Ficca | B62D 5/006 |
| 2023/0014650 | A1* | 1/2023 | Kim | H02K 5/04 |
| 2023/0322290 | A1* | 10/2023 | Wilson-Jones | B62D 5/006 |
| 2023/0331281 | A1* | 10/2023 | Wilson-Jones | B62D 5/0403 |
| 2023/0331290 | A1* | 10/2023 | Morris | B62D 1/16 |
| 2024/0116559 | A1* | 4/2024 | Kwon | B62D 15/0235 |
| 2024/0351631 | A1* | 10/2024 | Szegedi | B62D 5/006 |

FOREIGN PATENT DOCUMENTS

| | | | | |
|---|---|---|---|---|
| CN | 106585707 | A * | 4/2017 | ........... B62D 5/0421 |
| CN | 112722061 | A * | 4/2021 | ............... B62D 3/12 |
| CN | 112776879 | A * | 5/2021 | ............. B62D 5/005 |
| CN | 215553526 | U * | 1/2022 | |
| CN | 116902053 | A * | 10/2023 | ............... B62D 1/16 |
| CN | 116902054 | A * | 10/2023 | ............... B62D 1/16 |
| CN | 117842172 | A * | 4/2024 | ........... B62D 5/0409 |
| CN | 118103273 | A * | 5/2024 | ............. B62D 5/006 |
| CN | 112722061 | B * | 8/2024 | ........... B62D 5/0412 |
| DE | 4009400 | A1 | 9/1991 | |
| DE | 19902557 | A1 * | 7/2000 | ............. B62D 5/006 |
| DE | 10101827 | A1 * | 7/2002 | ............... B62D 5/06 |
| DE | 10103667 | A1 * | 8/2002 | ............. B62D 5/092 |
| DE | 60303081 | T1 | 7/2006 | |
| DE | 102020211974 | A1 * | 4/2021 | ............. B62D 5/006 |
| DE | 102020211976 | A1 * | 4/2021 | ........... B62D 5/0409 |
| DE | 102021211576 | A1 * | 4/2023 | ............. B62D 5/006 |
| DE | 102023201564 | A1 * | 10/2023 | ............... B62D 1/16 |
| DE | 102023202658 | A1 * | 10/2023 | ............... B62D 1/16 |
| DE | 102023209745 | A1 * | 4/2024 | ........... B62D 5/0409 |
| DE | 102022213599 | A1 * | 6/2024 | ............. B62D 5/006 |
| EP | 1358099 | B1 * | 12/2004 | ............. B62D 5/092 |
| EP | 1493649 | A2 * | 1/2005 | ............. B62D 5/006 |
| EP | 4023529 | A1 * | 7/2022 | ............. B62D 5/005 |
| EP | 4098516 | A1 * | 12/2022 | ............. B62D 5/006 |
| EP | 4098516 | B1 * | 7/2025 | ............... B62D 5/04 |
| GB | 2617632 | A * | 10/2023 | ............... B62D 1/16 |
| GB | 2620542 | A * | 1/2024 | ........... B62D 5/0409 |
| JP | 2003237612 | A * | 8/2003 | |
| JP | 2004042829 | A * | 2/2004 | |
| JP | 2006015865 | A * | 1/2006 | |
| JP | 4106990 | B2 | 6/2008 | |
| JP | 2009073334 | A * | 4/2009 | |
| JP | 2009184484 | A * | 8/2009 | |
| JP | 2010159040 | A * | 7/2010 | |
| JP | 2024536504 | A * | 10/2024 | ............. B62D 5/006 |
| JP | 7668421 | B2 * | 4/2025 | ............. B62D 5/006 |
| KR | 20180065067 | A * | 6/2018 | ........... B62D 5/0487 |
| KR | 101906007 | B1 * | 10/2018 | ............. B62D 5/006 |
| KR | 20240048911 | A * | 4/2024 | ........... B62D 5/0409 |
| WO | WO-0043251 | A1 * | 7/2000 | ............. B62D 5/006 |
| WO | 0239203 | A1 | 5/2002 | |
| WO | 2009007571 | A2 | 1/2009 | |
| WO | 2009063818 | A1 | 5/2009 | |
| WO | 2018197153 | A1 | 11/2018 | |
| WO | WO-2019005736 | A1 * | 1/2019 | ............. B62D 25/14 |
| WO | 2020104510 | A1 | 5/2020 | |
| WO | WO-2023061721 | A1 * | 4/2023 | ............. B62D 5/006 |
| WO | WO-2024126280 | A1 * | 6/2024 | ............. B62D 5/006 |

* cited by examiner

STEERING COLUMN FOR A STEER-BY-WIRE STEERING SYSTEM

This application is a 35 U.S.C. § 371 National Stage Application of PCT/EP2022/076385, filed on Sep. 22, 2022, which claims the benefit of priority to Serial No. DE 10 2021 211 576.4, filed on Oct. 14, 2021 in Germany, the disclosures of which are incorporated herein by reference in their entirety.

The present disclosure relates to a steering column for a steer-by-wire steering system for a motor vehicle.

BACKGROUND

In conventional steering systems, the desired steering angle is transferred from the steering wheel to the two front wheels via a mechanical connection. The steering torque is amplified by a servo gearbox to allow for simple steering.

In steer-by-wire steering systems, the mechanical connection between the steering wheel and steered wheels is eliminated. The steering angle set on the steering wheel is sensed by a sensor and transmitted electronically to the steering actuator, which then adjusts the front wheels accordingly.

The driver of the vehicle needs feedback on the steering wheel about the driving situation on the wheels, for example about the condition of the road surface. Moreover, the feedback generates a speed-dependent steering feel. In classical steering systems, these feedback forces were transmitted from the wheels to the steering wheel via the mechanical connection.

In steer-by-wire steering systems, the feedback can no longer be mechanically transmitted as there is no longer the mechanical connection between the steering column and steering gear. Thus, in SbW steering systems, feedback for the driver on the steering wheel must be simulated. This is done by an electric motor, which acts directly or indirectly on the steering wheel via a transmission.

The electrical feedback motor must provide a sufficient torque to provide the feedback needed in a timely manner. Higher torques need a correspondingly larger motor. A direct acting engine has a very good response as there is no transmission, but it must be dimensioned larger to produce the required torque. The torque of a smaller engine could be increased via an additional transmission, but more noise may also be produced.

It is the object of the disclosure to provide a steering column for a SbW steering system, wherein a feedback actuator is provided which should not use a large motor. Nevertheless, the feedback actuator should have a very good response.

This object is achieved by the subject matter set forth below. Advantageous embodiments are contained in the subject matter set forth below and emerge from the following description.

The fact that two smaller motors according to the disclosure are used for the feedback actuator, which are combined and variably used, results in a compact feedback actuator with a good response. A first electric motor is arranged in the steering wheel and acts directly there. With this motor, lower torques may be produced. A second electric motor is arranged behind the first motor and acts on the steering wheel via a transmission. With this motor, larger torques may be produced as needed.

The behavior of the feedback actuator is variable and depends on the driving situation, e.g. the speed of the vehicle or the steering angle. The two motors may each be used individually or simultaneously.

The steering shaft and steering wheel hub are fixed in this disclosure, that is, they cannot rotate. The feedback actuator of the steering column consists of a primary feedback unit and a secondary feedback unit.

The primary feedback unit is arranged close to the steering wheel and is comprised of a small motor that acts directly on the steering wheel or steering wheel rim. An inner portion of the motor is attached to the fixed steering shaft. An outer portion of the motor may rotate and is connected to the housing of the primary feedback unit. The housing of the primary feedback unit also supports the steering wheel rim.

The primary feedback unit is mounted via rolling bearings in the housing of the steering column and can thereby rotate in the housing.

The secondary feedback unit comprises a small motor that acts on the primary feedback unit via a transmission. Higher torque may be produced by the transmission.

As is known from steering columns with a fixed hub and steering shaft, more suitable airbag concepts or additional operating elements may be used on the hub. Electrical cables may be guided through the hollow steering shaft.

BRIEF DESCRIPTION OF THE DRAWINGS

An exemplary embodiment is described with reference to the figures. The figures show.

DETAILED DESCRIPTION

Figure 1:
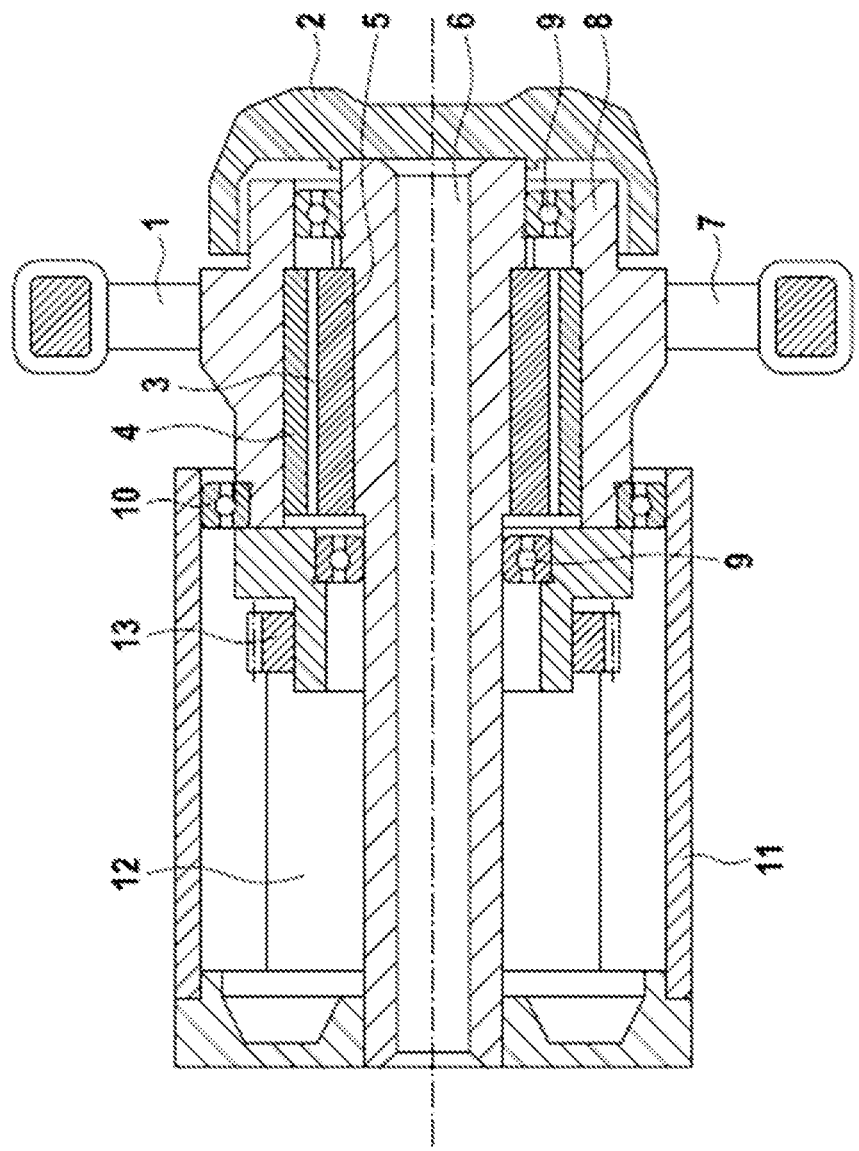
FIG. 1 the steering column according to the disclosure in a cross-section.

FIG. 1 shows the steering column according to the disclosure in a cross-section. The steering wheel 1 consists of a steering wheel rim 7 and a steering wheel hub 2, which has a fixed design. The steering wheel hub 2 is fixed to the end of the steering shaft 6, which also cannot rotate.

The feedback actuator of the steering column consists of a primary feedback unit and a secondary feedback unit. The primary feedback unit comprises a motor 3 arranged within the steering wheel 1. The motor 3 comprises an inner part 5, which is fixedly arranged on the steering shaft 6 and therefore cannot rotate. An outer portion 4 of the motor 3 may rotate and is connected to the housing 8 of the primary feedback unit. The housing 8 of the primary feedback unit also supports the steering wheel rim 7. The motor 3 thus acts directly on the steering wheel 1.

The primary feedback unit is mounted on the steering shaft 6 with two rolling bearings 9. In addition, the primary feedback unit is partially inserted into a housing 11 and mounted there via a rolling bearing 10. Thus, the primary feedback unit is rotatably arranged.

The housing 11 includes the secondary feedback unit. This comprises an electric motor 12, which acts on the rotatable primary feedback unit via a transmission 13.

Figure 2:
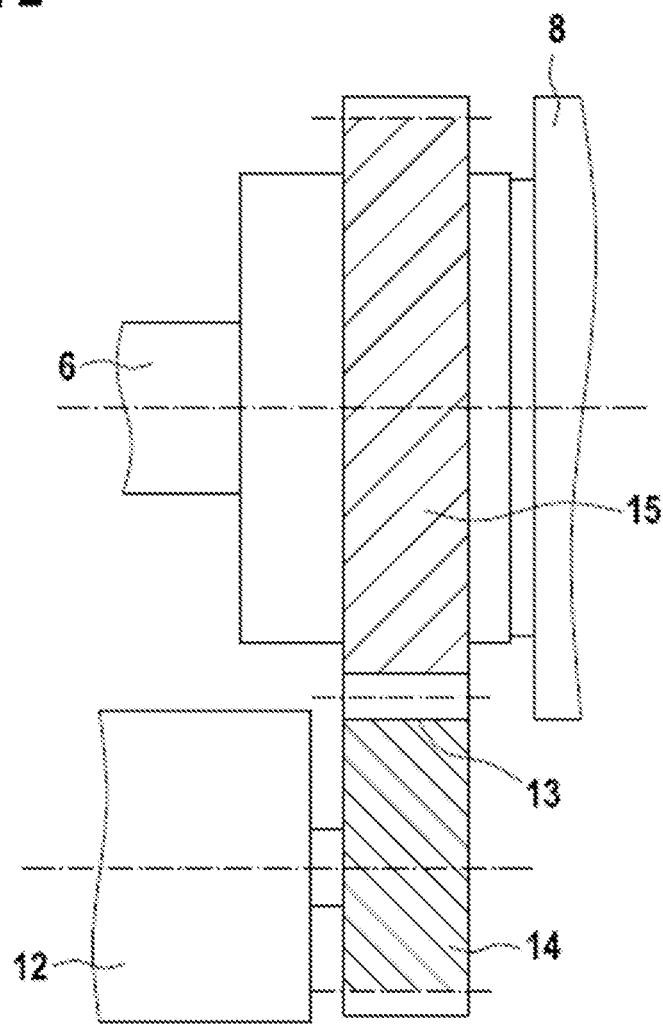
FIG. 2 a detailed illustration of the steering column according to the disclosure.

This can be seen in detail in FIG. 2, wherein the transmission 13 is shown with a view from below of the arrangement of FIG. 1. A gearwheel 15 is fixed to the housing 8 of the primary feedback unit by an interference fit. The electric motor 12 supports the gear wheel 14 and thus drives the gear wheel 15. A corresponding toothing form may be selected for the gear wheels 14, 15, for example, a helical gear cog, to enable quiet operation.

As an alternative to the gear train, other types of transmission are conceivable, for example a belt gear.

The invention claimed is:

1. A steering column for a steer-by-wire steering system for a motor vehicle, comprising:
   a steering wheel having a fixed steering wheel hub, and
   a force-feedback unit configured to transmit torque to the steering wheel,
   wherein the force-feedback unit includes a first electric motor and a second electric motor,
   wherein the first electric motor is configured to act directly on the steering wheel, and
   wherein the second electric motor is configured to act on the steering wheel via a transmission.

2. The steering column according to claim 1, further comprising a first housing, a second housing, and a steering wheel rim, wherein:
   the first electric motor and the first housing form a primary feedback unit,
   the primary feedback unit is rotatably mounted in the second housing, and
   the first housing supports the steering wheel rim.

3. The steering column according to claim 2, further comprising a fixed steering shaft, wherein:
   the first electric motor includes an inner part, which is fixedly arranged on the fixed steering shaft, and
   the first electric motor also includes an outer part which is configured to rotate and is connected to the first housing.

4. The steering column according to claim 2, further comprising a transmission, wherein:
   the second electric motor and the transmission form a secondary feedback unit,
   the secondary feedback unit is arranged in the second housing, and
   the second electric motor is configured to act on the primary feedback unit via the transmission.

5. The steering column according to claim 4, wherein:
   the transmission is configured as a gear train with a first gear wheel and a second gear wheel,
   the first gear wheel is fixedly connected to the first housing, and
   the second gear wheel is arranged on an output shaft of the second electric motor.

6. The steering column according to claim 4, wherein the primary feedback unit and the secondary feedback unit are configured to be employed individually or simultaneously as a function of a driving situation of the motor vehicle.

* * * * *